United States Patent [19]
Cherry et al.

[11] Patent Number: 5,288,100
[45] Date of Patent: Feb. 22, 1994

[54] AXLE SUPPORT BRACKET FOR A DRIVE AXLE SUSPENSION

[75] Inventors: Herbert J. Cherry, Albion, Pa.; Stefan Siarkiewicz, Spring Lake, Mich.

[73] Assignee: Nai Neway, Inc., Muskegon, Mich.

[21] Appl. No.: 942,437

[22] Filed: Sep. 9, 1992

Related U.S. Application Data

[63] Continuation-in-part of Ser. No. 669,038, Mar. 14, 1991, abandoned.

[51] Int. Cl.$^5$ ............................................. B60G 9/04
[52] U.S. Cl. ................................... 280/688; 280/661; 280/713
[58] Field of Search ............... 280/80.1, 688, 713, 280/661, 690, 693; 403/4; 180/905, 378, 725

[56] References Cited

U.S. PATENT DOCUMENTS

| | | | |
|---|---|---|---|
| Re. 30,308 | 6/1980 | Masser | 280/713 |
| 333,909 | 1/1886 | Willcoxson | 280/80.1 |
| 1,812,827 | 6/1931 | Gannett | 280/80.1 |
| 3,237,957 | 3/1966 | Harbers | . |
| 3,332,701 | 7/1967 | Masser | . |
| 3,547,215 | 12/1970 | Bird | . |
| 3,960,388 | 6/1976 | Strader et al. | 280/693 |
| 4,194,760 | 3/1980 | Shiomi et al. | 280/661 |
| 4,615,539 | 10/1986 | Pierce | 280/713 |
| 4,693,486 | 9/1987 | Pierce et al. | 280/713 |
| 4,858,949 | 8/1989 | Wallace et al. | . |

Primary Examiner—Karin L. Tyson
Attorney, Agent, or Firm—Varnum, Riddering, Schmidt & Howlett

[57] ABSTRACT

A support bracket is provided for adjusting the pinion angle of an axle when mounting the axle to a trailing arm in a vehicle suspension. The bracket comprises a pair of spaced arms connected by a web. Each of the arms has a first aperture and a second aperture with the corresponding apertures on the spaced arms being aligned. The first apertures are elongated in an arc with a radius having is origin centered in the second aperture. The support bracket fixedly supports an axle and is mounted to the trailing arm by pins extending through and between the apertures and through bushed connections in the trailing arm so that the bracket is pivotable relative to the trailing arm about the pin extending through the second apertures.

16 Claims, 5 Drawing Sheets

AXLE SUPPORT BRACKET FOR A DRIVE AXLE SUSPENSION

This application is a continuation in part of U.S. application Ser. No. 07/669,038, filed Mar. 14, 1991, now abandoned.

BACKGROUND OF THE INVENTION

1. Field of the Invention

This invention relates to vehicle suspension systems for wheeled vehicles. More particularly, the invention relates to an axle support bracket which facilitates adjustment of the pinion angle of a drive axle.

2. State of the Prior Art

Vehicle suspension structures are well known in the art. In particular, vehicle suspension structures having arms suspended from a vehicle frame and a wheel bearing axle suspended from the trailing arm are known. Examples of this type of vehicle suspension structure are disclosed in U.S. Pat. No. 3,547,215 to Bird; and U.S. Pat. No. 4,693,486 to Pierce et al.

In vehicle suspension structures adapted to support a drive axle of the vehicle, it is important to maintain the proper pinion angle. Different vehicles having different engine locations require different pinion angles. In many suspensions, the drive axle is simply welded to the axle bracket on the trailing arms, and the appropriate pinion angle must be determined prior to welding the axle. This requires a significant investment in labor and materials to properly position a heavy axle prior to welding.

In U.S. Pat. No. 4,858,949 to Wallace et al., there is disclosed a lightweight trailing arm suspension wherein the axle is mounted to the trailing arm in a structure similar to the Bird patent. However, one of the pins extending through the axle bracket has an eccentric configuration to permit the use of shims to adjust the pinion angle of the axle. Thus, a drive axle utilizing the Wallace et al. suspension can have its pinion angle adjusted even after the axle is permanently secured to the vehicle.

There remains a need, however, for an axle supporting bracket which is easily adaptable to a multitude of different axle configurations and which is simple to adjust for a particular pinion angle requirement.

SUMMARY OF THE INVENTION

In accordance with the invention, a support bracket is provided for mounting an axle to a trailing arm in a vehicle suspension. The support bracket comprises a pair of spaced arms connected by a web. The spaced arms and the web thereby define a channel, and the channel is adapted to receive one of the trailing arms. The web is adapted to fixedly support the axle.

Each of the arms has a first aperture and a second aperture, with the first and second apertures of one of the arms being aligned, respectively, with the first and second apertures of the other of the arms. Each of the first apertures is elongated in an arc, and the radius of the arc has its origin in the center of the second aperture. Each aperture is adapted to receive a pin for mounting the support bracket to the trailing arm so that when the support bracket is so mounted, it is pivotable relative to the trailing arm about an axis extending between the centers of the second apertures.

In one aspect of the invention, the narrowest width of the first aperture is greater than the diameter of the pin. The edges of the arm defining the first aperture thereby form a cam surface which is adapted to receive a cam follower on the pin when the pin is disposed within the aperture.

In another aspect of the invention, the pin mounts the support bracket to the trailing arm by bushed connections in the trailing arm. The pin has a nut threaded onto one end, and a washer disposed on the pin adjacent an outer surface of one of the plates. When the nut is tightened, the washer is fixed against the outer surface. When the support bracket is pivoted to a predetermined angle relative to the trailing arm as defined by a predetermined pinion angle of the axle, the washer is welded to the outer surface of the arm.

BRIEF DESCRIPTION OF THE DRAWINGS

The invention will now be described with reference to the accompanying drawings, in which.

DESCRIPTION OF THE PREFERRED EMBODIMENT

Figure 1A:
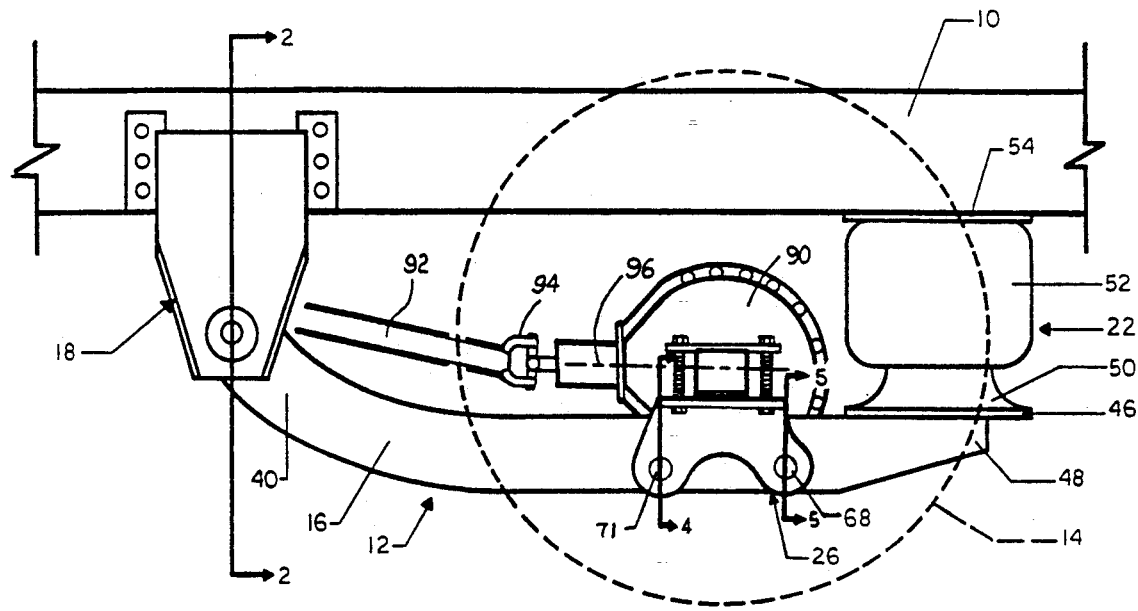
FIG. 1A is a side elevational view of a typical trailing arm and suspension incorporating an adjustable axle support bracket according to the invention with an axle fixed at a predetermined pinion angle.
Figure 1B:
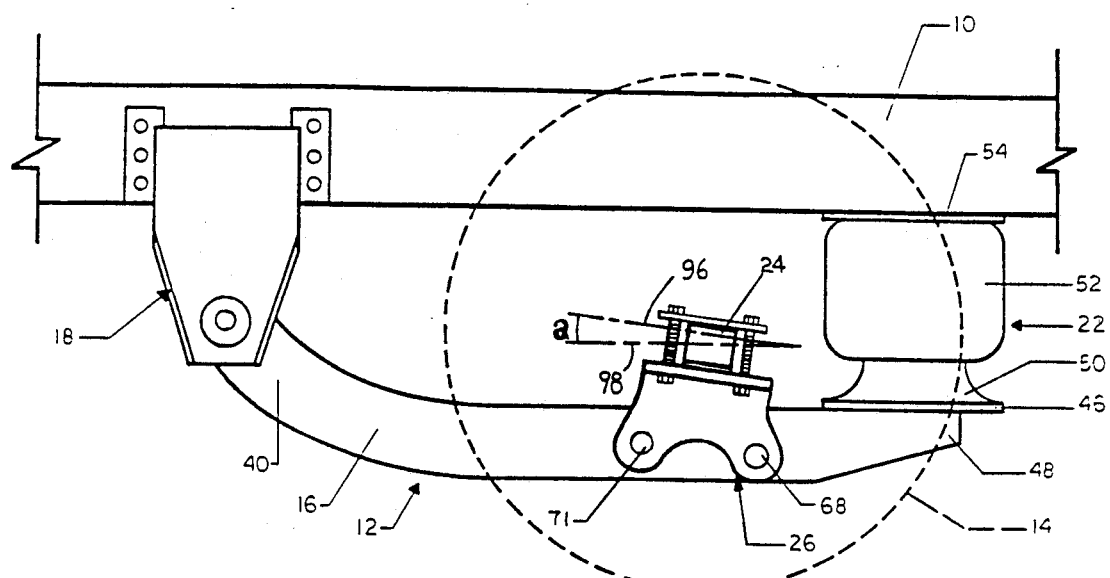
FIG. 1B is a side elevational view of the suspension of FIG. 1A with an axle fixed at a second predetermined pinion angle.

Referring now to the drawings and to FIGS. 1A and 1B in particular, there is shown a portion of a vehicle frame 10 with the front of the vehicle to the left as illustrated in the drawings. A suspension system generally shown as 12 mounts the frame to ground-engaging wheels 14 (shown in phantom). The suspension system 12 is formed from a substantially rigid trailing arm 16 which is pivotally mounted to a frame bracket assembly 18. It will be understood that a like trailing arm is mounted to an opposite side of the vehicle frame in similar manner with an aligned pivot. The trailing arm 16 mounts an air spring assembly 22 at another end thereof, the upper portion of which is secured to the frame 10 so as to cushion the upward and downward movement of the frame with respect to an axle 24. The axle is supported by an axle support bracket 26 which, in turn, is mounted to the trailing arm 16. It is the axle support bracket 26 which embodies the invention.

It can be seen in FIGS. 1A and 1B that the axle 24 is a drive axle having a differential housing 90 to which a drive shaft 92 is connected by a conventional universal joint 94. The connecting angle at which the longitudinal axis of the drive shaft 92 intersects the forward axis 96 of the differential 90 at the joint 94 is preferably 180 degrees when the vehicle is at rest. The pinion angle may be defined for purposes of the invention as the angle α of the differential forward axis 96 from a horizontal plane 98. The axle support bracket 26 enables adjustment of the pinion angle to obtain the preferable connecting angle so that the suspension system 12 can be used on different vehicles without redesign or manufacture of special parts.

Figure 2:
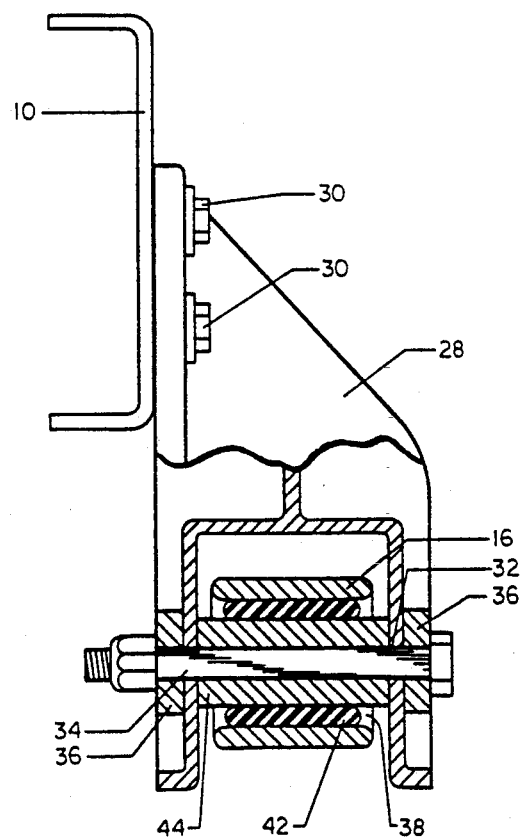
FIG. 2 is a view partly in cross section taken along lines 2—2 of FIG. 1.

The frame bracket assembly 18 as shown in FIGS. 1A, 1B, and 2 comprises a frame bracket 28 mounted to a side of the frame 10 by means of bolts 30. The frame bracket 28 projects laterally outwardly of the side of the frame 10 into alignment with the horizontal space between the frame 10 and the ground-engaging wheel 14. The frame bracket 28 has an elongated opening 32 in each of two depending arms through which a pin 34 passes. The openings are elongated in the direction of the axis of the vehicle so as to permit the pin 34 to shift forwardly or rearwardly with respect to the frame bracket 28. An adjustment plate 36 is provided on each end of the pin and in juxtaposition to the outside surfaces of the frame bracket 28. Preferably, the frame bracket and adjustment plates have interengaging serrations for a gripping adjustment as disclosed and claimed in U.S. Pat. No. 4,595,216, issued Jun. 16, 1986, which is incorporated herein by reference. The bracket and plates may also be welded together.

The trailing arm 16 includes a transverse opening 38 at the forward end 40 thereof. The opening 38 mounts on an elastomeric bushing 42 and receives the pin 34 to pivotably mount the trailing arm 16 to the frame bracket assembly 18. The trailing arm 16 is pivotally mounted to the frame bracket for pivotable movement with respect thereto through an inner sleeve bushing 44 and the elastomeric bushing 42. The inner sleeve bushing 44 abuts against the interior of the depending arms of the frame bracket 28 so that the tightening of the pin 34 will clamp the inner sleeve bushing 44 tightly within the frame bracket 28. On the other hand, the elastomeric bushing 42 has a length less than the length of the inner sleeve bushing 44 and is thus rotatable with respect to the inner sleeve 44. In practice, the elastomeric bushing 42 provides articulation of the trailing arm 16 about the pin 34 in a torsional sense as well as in a linear sense. In other words, the trailing arm 16 can pivotably articulate about the axis of the pin 34 as well as about an axis perpendicular to the axis of the pin 34.

An air spring lower mounting plate 46 is mounted to the trailing arm 16 at the distal end 48 thereof. The air spring lower mounting plate supports a piston 50. An air spring 52 is disposed between the piston 50 and an upper mounting plate 54 by which the upper end of the air spring 52 is securely attached to the frame 10.

Figure 3:
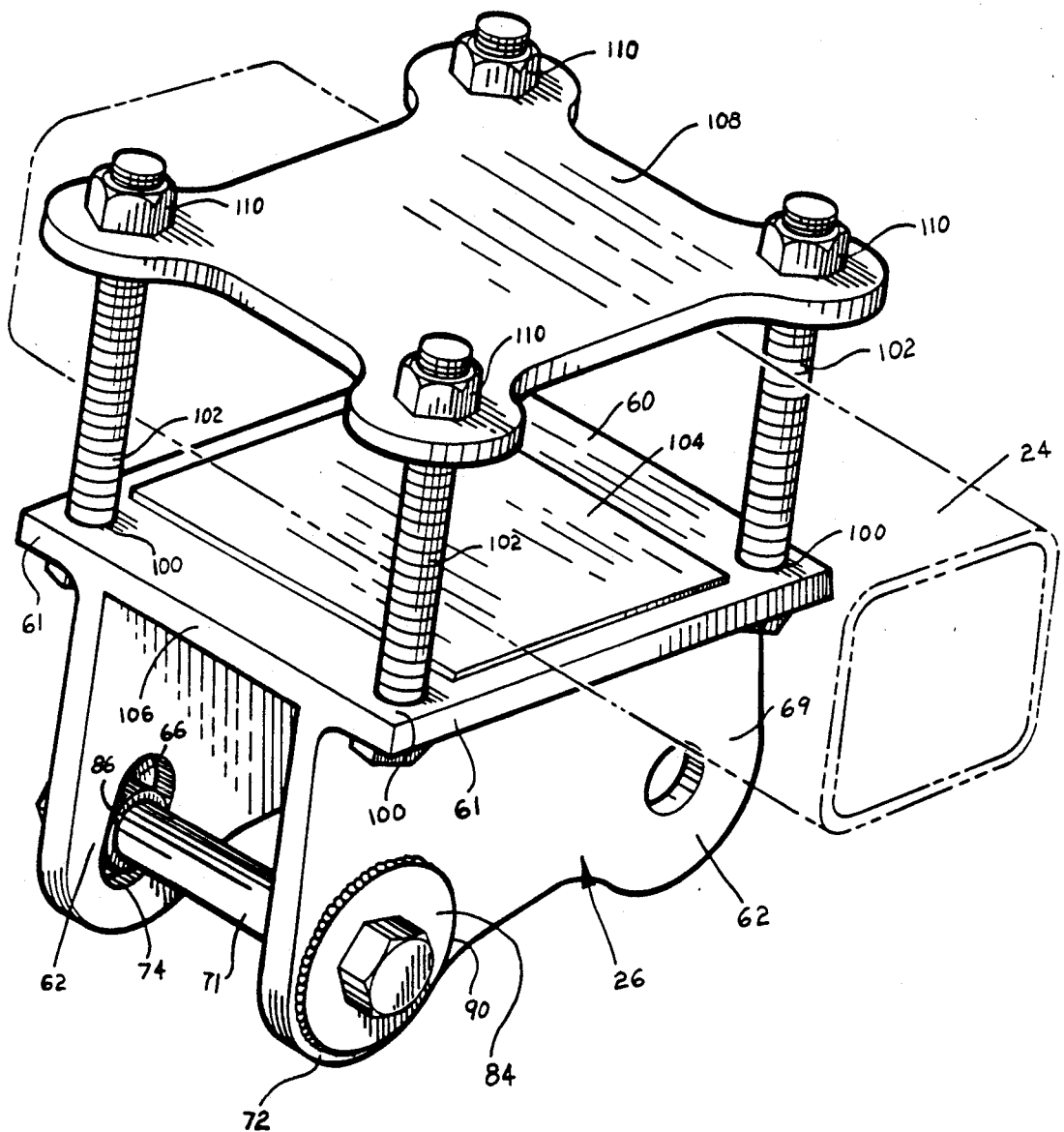
FIG. 3 is an isometric view of the axle support bracket with a forward pin according to the invention.
Figure 4:
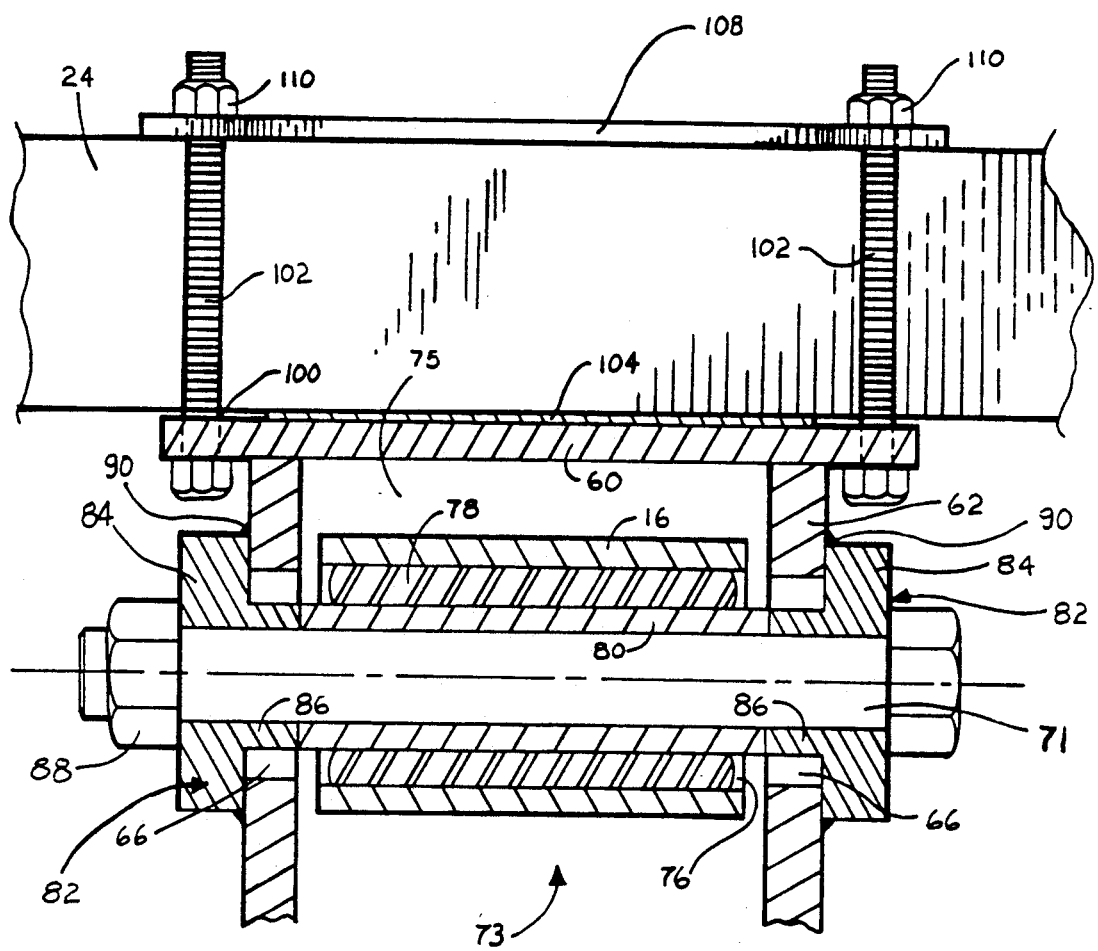
FIG. 4 is a sectional view taken along line 4—4 of FIG. 1A.
Figure 5:
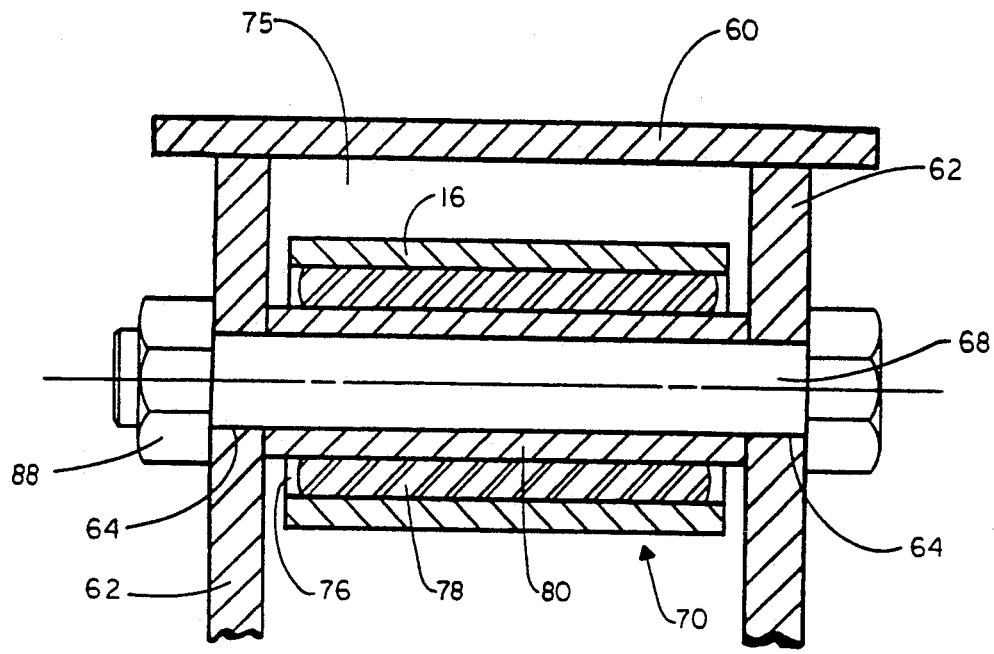
FIG. 5 is a sectional view taken along line 5—5 of FIG. 1A.

The axle support bracket 26 is more clearly shown in FIGS. 3, 4 and 5.

Looking now at FIG. 3, the axle support bracket 26 generally comprises a web 60 from which a pair of oppositely disposed platelike arms 62 depend. Each arm has a pair of apertures, one rearward 64 and one forward 66. The rearward apertures are aligned with each other, and likewise, the forward apertures 66 are aligned with each other. The rearward apertures 64 are adapted to receive a rear pin 68. The rear pin 68 mounts the rearward portion 69 of the axle support bracket 26 to the trailing arm 16 by a rearward bushed connection 70 (see FIG. 5). Similarly, a forward pin 71 is adapted to be received by the forward apertures 66 and secure the forward end 72 of the axle support bracket 26 to the trailing arm 16 by a forward bushed connection 73 (see FIG. 4). However, it can be seen that the forward apertures 66 are elongated in a vertical direction, somewhat normal to the longitudinal axis of the trailing arm 16, thus forming slots. More specifically, each forward slot 66 is disposed on an arc with a radius having its origin centered in the rearward aperture 64. The edges of each forward slot 66 define a cam surface 74.

The detailed structure of the forward bushed connection 73 between the forward pin 71 of axle support bracket 26 and the trailing arm 16 is illustrated in FIG. 4. The laterally spaced arms 62 of the axle support bracket 26 embrace the trailing arm 16. In other words, the web 60 and the arms 62 define a channel 75 in which the trailing arm 16 is received. The trailing arm 16 has an opening 76, which is aligned with the pair of forward slots 66 in the axle bracket 26. Within the opening 76 is pressfitted a rubber bushing 78 bonded to an inner metal sleeve 80, the metal sleeve being longer than the width of the trailing arm 16. The bushed connection 73 is thus generally analogous to the pivotal connection between the forward end of the trailing arm 16 and the frame bracket assembly 18. However, a stepped washer 82 is provided for the pin 71 at each forward slot 66. Each washer 82 comprises a head portion 84 and a cam portion 86, the cam portion being disposed within the slot 66, and the head portion 84 being disposed adjacent to and in contact with an outer surface of the respective arm 62. The cam portion 86 thus forms a cam follower which can slide on the cam surface 74, while the head portion 84 preferably has a diameter greater than the largest dimension of the slot 66. The pin 71 extends through the washers 82 and the sleeve 80. The metal sleeve 80 is adapted to abut an inner surface of the cam portion 86 of each washer 82 and be held securely therebetween when the pin 71 is tightened. The pin 71 is adapted to be tightened by a nut 88.

The detailed structure of the rearward bushed connection 70 is illustrated in FIG. 5. It can be seen that the rearward bushed connection 70 is similar to the forward bushed connection 73, the principal difference being the lack of stepped washers and slots. The trailing arm 16 is similarly disposed within the channel 75 and has an opening 76' aligned with the rear apertures 64. A rubber bushing 78' is bonded to an inner metal sleeve 80' and press-fit into the opening 76'. The sleeve 80' and the apertures 64 receive the rear pin 68 with ends of the sleeve tightly abutting the inner surface of arms 62. The pin 68 is tightened by a nut 88'. Thus, before tightening, the axle support bracket 26 is pivotable about rear pin 68 so that the forward end 72 thereof moves relative to the forward pin 71 between the limits defined by the length of the forward slots 66 as each cam portion 86 moves on each cam surface 74.

The axle 24 is fixedly mounted to the axle support bracket 26 by any one of a number of conventional ways well known to those skilled in the art, the actual manner of mounting not being pertinent to the invention. For example, the axle 24 may be bolted to the bracket 26 by U-bolts as in the Neway Corp. AR-1 series suspension or as illustrated in U.S. Pat. No. 4,371,190 to Vandenberg, issued Feb. 1, 1983. Alternatively, the axle 24 can be welded to a saddle-like portion on the support bracket 26 as shown in U.S. Pat. No. 3,332,701 to Masser, incorporated herein by reference. Preferably, the manner of securing the axle 24 to the bracket 26 will depend upon the structure and configuration of the axle. It will be understood that a bracket 26 of the present invention is intended to be adaptable as a retrofit on existing suspensions as well as original equipment on new suspensions.

In the embodiment illustrated in FIGS. 3 through 5, the axle 24 is clamped to the axle support bracket 26. The web 60 has flanges 61 extending outwardly beyond the depending arms 62. Each flange has apertures 100 through which bolts 102 extend upwardly. A crush plate 104 is disposed on the upper surface 106 of the web 60, and the axle 24 rests transversely of the channel in the bracket 26 on the crush plate. An upper clamping plate 108 is received over the bolts 102. Nuts 110 on the bolts tighten the clamping plate 108 against the axle 24 to clamp the axle to the support bracket 26.

During assembly of the vehicle suspension, it is necessary to adjust the axle 24 to a predetermined pinion angle as suitably required to place a particular drive axle in alignment with a particular engine. With the axle support bracket 26 of the invention, the forward and rearward pins 71, 68 are loosened to permit the bracket 26 and the axle 24 mounted thereto to pivot about the rear pin 68. The pivot angle is typically within a range of seven or eight degrees as provided by the limit of travel of the cam portion 86 within the forward slots 66. When the predetermined pinion angle is obtained by rotating the axle bracket 26 about the rear pin 68, the head portions 84 of the stepped washers 82 on the forward pin 71 are welded to the adjacent depending arms 62 of the axle support bracket 26 by weldments 90 as shown in FIGS. 3 and 4. With this operation, the pinion angle is set according to the fixed position of the axle support bracket 26 relative to the trailing arm 16.

It is contemplated that in most suspensions utilizing the present invention, no further adjustment of the pinion angle would be necessary or desirable.

It will further be understood that reasonable variations and modifications of the embodiment described are possible without departing from the scope of the invention as defined by the appended claims. For example, it will be understood that slots could be provided at the rearward portion of the bracket so that the bracket pivots about the forward pin. Similarly, slots can be provided in both the front and rear portions of the axle support bracket.

The embodiments of the invention in which an exclusive property or privilege is claimed are defined as follows:

1. A support bracket for mounting a drive axle to a trailing arm in a vehicle suspension, the support bracket comprising:

a pair of spaced arms connected by a web, said arms and an inner surface of the web thereby defining a first channel having a first longitudinal axis, said first channel being adapted to receive the trailing arm therein along the first longitudinal axis;

securing means on an outer surface of said web, said securing means defining a second channel having a second longitudinal axis transverse to the first longitudinal axis for securely receiving the drive axle in the second channel transversely of the first channel;

each of the arms having a first aperture and a second aperture formed therein, the first and second apertures of one of the arms being aligned, respectively, with the first and second apertures of the other of the arms;

each of said first apertures being elongated in an arc with a radius having its origin centered in the second aperture; and each aperture being adapted to receive a pin for mounting the support bracket to the trailing arm, whereby when the support bracket is so mounted, it is pivotable relative to the trailing arm about a pivot axis extending between centers of the second apertures.

2. The support bracket of claim 1 wherein the narrowest width of one of the first apertures is greater than the diameter of the pin, the edges of the arm defining said first aperture thereby forming a cam surface adapted to receive a cam follower on the pin when the pin is disposed within the aperture.

3. In a vehicle suspension system for mounting ground engaging drive wheels to a vehicle frame, the suspension system comprising a pair of substantially rigid arms secured to opposite sides of the frame through substantially aligned pivot mounts; at least one wheel-carrying drive axle mounted transversely to the arms; a drive shaft connected to the at least one drive axle at a pinion angle; and an axle support means for securing said at least one drive axle to each of the arms; the improvement in each of the axle support means comprising:

a support bracket having a pair of spaced plates connected by a web, said plates and web thereby defining a channel in which the rigid arm is received, said at least one drive axle being fixedly secured to the web;

each of the plates having a first aperture and a second aperture, the first and second apertures on one of the plates being aligned, respectively, with the first and second apertures on the other of the plates;

each of said first apertures being elongated in an arc with a radius having its origin centered in the second aperture;

a first pin extending through and between the first apertures and the trailing arm;

a second pin extending through and between the second apertures and the trailing arm, wherein the support bracket is pivotable relative to the trailing arm about the longitudinal axis of the second pin so that said pinion angle is adjustable to a predetermined measurement; and a weldment securing the first pin to at least one of the plates at the predetermined measurement.

4. The improvement of claim 3 wherein the narrowest width of one of the first apertures is greater than the diameter of the first pin, the edges of the plate defining said first aperture thereby forming a cam surface adapted to receive a cam follower on the pin, said cam follower disposed within the first aperture.

5. The improvement of claim 4 wherein a stepped washer is disposed on the pin, said washer having a portion which forms the cam follower.

6. The improvement of claim 3 wherein the pin has an end adapted to receive a threaded nut, and a washer is disposed on the pin adjacent to an outer surface of one of the plates.

7. The improvement of claim 3 wherein a washer is disposed on the first pin adjacent an outer surface of one of the plates, and the weldment is between the washer and the outer surface when the predetermined measure is obtained.

8. The improvement of claim 3 wherein the first and second pins are connected to the trailing arm by bushed connections.

9. A method of mounting a drive axle to a movable member in a vehicle suspension comprising:

providing a support bracket having a pair of spaced arms connected by a web, said spaced arms and web thereby defining a channel, each arm having a first aperture and a second aperture, the first and second apertures on one arm being aligned, respectively, with the first and second apertures on the other arm, each of said first apertures being elongated in an arc with a radius having its origin centered in the second aperture;

fixedly securing the drive axle to the web transversely of the channel;

locating the movable member within the channel;

inserting a first pin through the first apertures and through a bushed connection with the movable member;

inserting a second pin through the second apertures and through a bushed connection with the movable member;

rotating the support bracket about the longitudinal axis of the second pin to a predetermined angle relative to the movable member; and welding the first pin to the arms.

10. An assembly for mounting a drive axle to a trailing arm in a vehicle suspension at a predetermined pinion angle relative to the vehicle, said trailing arm having one end pivotably mounted to a vehicle, another end free to move relative to the vehicle against a spring bias, and first and second openings intermediate the pivoted end and the free end, the assembly comprising:

a support bracket having a pair of spaced arms connected by a web, said arms and an inner surface of the web thereby defining a first channel for receiving the trailing arm, and said web further having a mounting bracket on an outer surface thereof, said mounting bracket having a second channel transverse to the first channel to fixedly receive the axle therein transversely of the trailing arm;

each of the arms having a first aperture and a second aperture formed therein, the first and second apertures of one of the arms being aligned, respectively, with the first and second apertures of the other of the arms;

each of said first apertures being elongated in an arc with a radius having its origin centered in the second aperture;

a first pin for extending through the second apertures and the second opening to pivotably mount the support bracket to the trailing arm;

a second pin for extending through the first apertures and the first opening; and means to fix the second pin within the first apertures so that when the support bracket is so mounted, it is pivotable relative to the trailing arm about an axis extending between centers of the second apertures and can be fixed when a predetermined pinion angle is obtained.

11. The assembly of claim 10 wherein the narrowest width of one of the first apertures is greater than the diameter of the second pin, the edges of the arm defining said first aperture thereby forming a cam surface and said pin has a cam follower to facilitate movement of the pin relative to the first aperture.

12. An assembly for mounting a drive axle to a trailing arm suspension in a vehicle at a predetermined angle relative to the vehicle, said trailing arm having one end pivotably mounted to the vehicle and another end free to move relative to the vehicle against a spring bias, the assembly comprising:

a support bracket;

mounting means for pivotally mounting the support bracket to the trailing arm;

securing means for fixedly mounting the axle to the support bracket transversely; and lock means for locking the support bracket and the axle at a predetermined angle relative to the vehicle wherein the predetermined angle is equivalent to the pinion angle of a shaft connected to the axle;

whereby a single support bracket can be used in any one of a variety of vehicle each having a different pinion angle.

13. The assembly of claim 12 wherein the mounting means comprises:

a pin extending laterally from the trailing arm, said pin having a longitudinal axis;

the bracket mounted on the pin for rotation about the longitudinal axis.

14. The assembly of claim 12, wherein the lock means comprises:

the bracket having a portion defining an aperture;

a pin extending laterally from the trailing arm and received in the aperture;

the aperture being sized to permit the bracket to be pivotably moved about the mounting means while the pin extends through the aperture;

holding means for affixing the pin within the aperture thereby inhibiting movement of the bracket relative to the pin when a predetermined angle is obtained.

15. The assembly of claim 14 wherein the aperture is an elongated arc with a radius having its origin at the mounting means.

16. The assembly of claim 14 wherein the holding means comprises a washer disposed on the pin and the washer is welded to the bracket when the predetermined angle is obtained.

* * * * *